US007177592B2

(12) United States Patent
Jarett (10) Patent No.: US 7,177,592 B2
(45) Date of Patent: Feb. 13, 2007

(54) WIRELESS COMMUNICATION SYSTEM WITH SPLIT SPOT BEAM PAYLOAD

(75) Inventor: Keith Jarett, Lafayette, CA (US)

(73) Assignee: The Boeing Company, Chicago, IL (US)

( * ) Notice: Subject to any disclaimer, the term of this patent is extended or adjusted under 35 U.S.C. 154(b) by 705 days.

(21) Appl. No.: 10/449,961

(22) Filed: May 30, 2003

(65) Prior Publication Data

US 2004/0242152 A1    Dec. 2, 2004

(51) Int. Cl.
H04B 7/185    (2006.01)
(52) U.S. Cl. .................. 455/12.1; 455/3.02; 455/3.04; 455/13.2; 455/13.3; 455/427; 455/428; 455/429; 455/446; 455/447
(58) Field of Classification Search .............. 455/3.02, 455/3.04, 12.1, 13.2, 13.3, 427–430, 446, 455/447, 450, 453
See application file for complete search history.

(56) References Cited

U.S. PATENT DOCUMENTS

| 3,711,855 | A | * | 1/1973 | Schmidt et al. ............. 342/353 |
|---|---|---|---|---|
| 4,482,897 | A | * | 11/1984 | Dragone et al. ............. 343/779 |
| 4,599,619 | A | * | 7/1986 | Keigler et al. .............. 342/352 |
| 4,630,058 | A | * | 12/1986 | Brown ........................ 342/359 |
| 4,799,065 | A | * | 1/1989 | Thompson .................. 343/779 |
| 4,813,036 | A | * | 3/1989 | Whitehead .................. 370/325 |
| 5,625,868 | A | * | 4/1997 | Jan et al. .................... 455/13.4 |
| 5,722,049 | A | * | 2/1998 | Hassan et al. ................ 455/10 |
| 5,825,325 | A | * | 10/1998 | O'Donovan et al. ........ 342/353 |
| 6,135,389 | A | | 10/2000 | Fowell |
| 6,150,977 | A | | 11/2000 | Wilcoxon et al. |
| 6,225,964 | B1 | * | 5/2001 | Fermelia et al. ............ 343/909 |
| 6,233,451 | B1 | * | 5/2001 | Noerpel et al. ............. 455/427 |
| 6,336,030 | B2 | * | 1/2002 | Houston et al. ........... 455/13.2 |
| 6,496,682 | B2 | * | 12/2002 | Butte et al. ................ 455/12.1 |
| 6,600,921 | B1 | * | 7/2003 | Pietrusiak .................. 455/429 |
| 6,653,975 | B2 | * | 11/2003 | Branscombe et al. ....... 342/354 |
| 6,868,269 | B1 | * | 3/2005 | Hagen et al. ............... 455/429 |
| 7,020,462 | B1 | * | 3/2006 | Wesel ......................... 455/427 |
| 2003/0001773 | A1 | * | 1/2003 | Harmon et al. ............ 342/352 |

FOREIGN PATENT DOCUMENTS

WO    WO9943104    *    8/1999

OTHER PUBLICATIONS

U.S. Appl. No. 10/172,214, Jarett.

* cited by examiner

Primary Examiner—Matthew D. Anderson
Assistant Examiner—Sujatha Sharma
(74) Attorney, Agent, or Firm—Ingrassia Fisher & Lorenz, P.C.

(57) ABSTRACT

A wireless communication system includes multiple wireless communication platforms carrying reflectors for providing spot beams. By using multiple platforms, the payload can be split. Each platform carries only a part of the reflectors needed to provide coverage for a certain geographic area. That allows the reflectors to be of larger size providing smaller spot beams. The multiple platforms of the wireless communication system are designed to be interchangeable. Therefore, only one standby platform is necessary for backup. By further providing an closed-loop pointing control method it is possible to keep multiple platforms pointed accurately relative to each other and relative to the user coverage area.

31 Claims, 3 Drawing Sheets

WIRELESS COMMUNICATION SYSTEM WITH SPLIT SPOT BEAM PAYLOAD

BACKGROUND OF THE INVENTION

The present invention generally relates to wireless communication systems and antenna pointing systems and, more particularly, to a wireless communication system including multiple interchangeable platforms for splitting a payload, a closed-loop pointing control method, and a method for providing continuous coverage over a wide geographic area.

Modern satellites and other wireless communication platforms often employ a large number of narrow spot beams providing a beam laydown that forms a cellular coverage of a wide geographic area. Both satellite systems and stratospheric platform systems have size limitations on the communication payload. These limitations make it difficult to package a large multi-reflector antenna subsystem for spot beam area coverage on a single payload.

In a communication system using spot beams, the same frequency needs to be used at the same time at two or more locations. Therefore, the antenna subsystem needs to be able to sufficiently isolate the signals from each other. This is called spatial isolation and spatial re-use. Typically, the distance between re-uses is 2 to square root of 7 cell radii, measured from center to center of two circular cells, which use the same frequency at the same time. Therefore, in general, smaller spot beams allow re-use at a closer distance than larger spot beams. Because the spot beam or cell size is inversely proportional to a diameter of the antenna aperture, achieving a smaller spot beam size requires a larger reflector.

Figure 1:
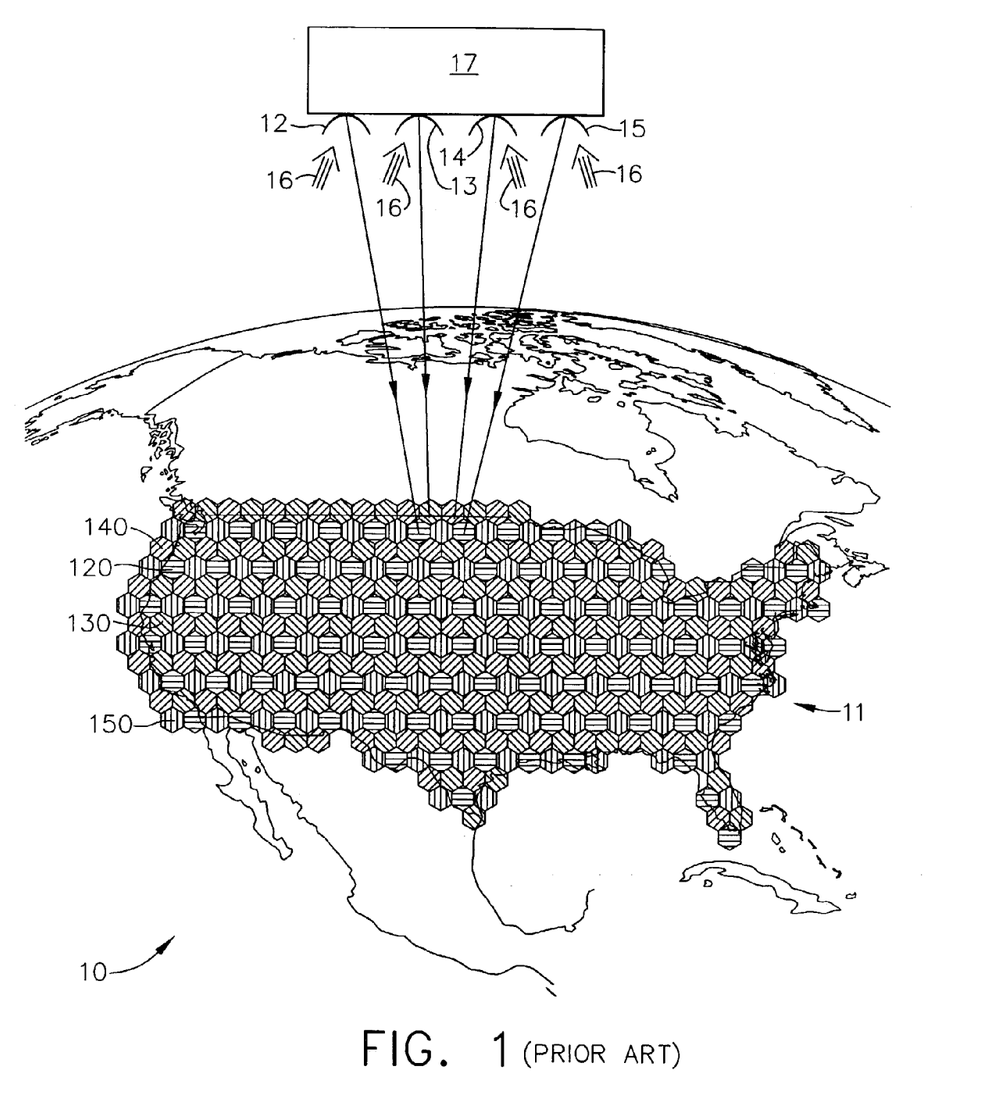
FIG. 1 is a schematic view of a prior art model for a 4-shaded re-use pattern covering the lower 48 states of the U.S.A.

As is well known to antenna designers skilled in the art, cellular spot beam coverage is best implemented using several reflectors, usually 3 or 4. FIG. 1 shows a model 10 for a 4-shaded re-use pattern covering the lower 48 states of the U.S.A. If a desired geographic area 11 is covered with overlapping circular cells (120, 130, 140, and 150) and the cells (120, 130, 140, and 150) have a 4-shaded repeating pattern, as shown in FIG. 1, then a wireless communication platform 17 carries four reflectors 12, 13, 14, and 15 and each reflector 12, 13, 14, and 15 serves one of the different shades. For example, a first reflector 12 serves cell 120, a second reflector 13 serves cell 130, a third reflector 14 serves cell 140, and a fourth reflector 15 serves cell 150. Each reflector has in its focal plane an array of antenna feeds 16, each of which generates one spot in that antenna's shade. The fact that one focal plane serves only one shade allows each feed to be larger than it would be if all four shades had to be served using one reflector. In the 4-shades model 10, as shown in FIG. 1, the feeds 16 can be twice as large in diameter. Larger feeds have the advantage of providing a "flatter" beam for each cell, with less variation in signal strength from the center to the edge of the cell. However, since the communication payload has size limitations, it is difficult or even impossible to package a multi-reflector subsystem that has four large enough reflectors to provide high quality spot beam area coverage on a single payload. Further, each active communication platform is required to have a standby platform to provide backup in case of a failure of the active platform resulting in high costs.

However, mounting the reflectors on different platforms or satellites has the disadvantage that the potential pointing error increases with the number of platforms. If spot beams are provided by multiple platforms for covering one geographic area, it is necessary that the spot beams are pointed accurately relative to each other and relative to the user coverage area. Spot beam antenna patterns are nominally fixed, but they do change as the platform (e.g., a satellite or stratospheric platform) is disturbed, and as the antenna's characteristics change, for example due to sun-induced warping. These changes in the spot beam pattern can be computer simulated, but they are not easily measured in an operational system. Current systems can check performance at pre-selected points, but they do not provide a global picture of the beam patterns.

Prior art satellite systems sometimes employ star trackers to keep the satellite itself accurately pointed. These systems solve part of the problem, but the antenna can contribute pointing errors even if the satellite itself is pointed perfectly. Star trackers are also expensive, and they add mass to the satellite. Further, prior art communication systems may use closed-loop beacon tracking systems. These systems use a transmitter on the ground and one or more receiving beams on the satellite. The closed-loop operates to null signal, which is often the difference between two component signals. When the tracking signal is nulled, the antenna is correctly pointed at the beacon location. Unfortunately, other parts of the antenna pattern may still be incorrect in other directions. Further providing the error zero at the beacon location may not be the best compromise for overall system performance. Beacon tracking systems also add hardware and mass to the communication platform.

Prior art further includes, for example, U.S. Pat. No. 4,630,058 issued to Brown and U.S. Pat. No. 4,599,619 issued to Keigler et al., both utilizing satellite pointing based on ground measurements of the ratios of signal strengths between narrow-angle and wide-angle beams using beacon signals. U.S. Pat. No. 6,150,977 issued to Wilcoxon et al., discloses a method for determining antenna pointing errors of satellite antenna that produces at least one spot beam having corresponding gain pattern and an antenna adjustable relative to the satellite body. Therefore, pointing adjustments are made in the position of the antenna relative to the satellite rather than to the altitude control systems of the satellite. U.S. Pat. No. 6,135,389 issued to Fowell, discloses a method for steering the payload beam of a satellite in a non-geostationary orbit toward an intended service area having known geographical dimensions in order to obtain improved pointing performance with a corresponding reduction in the demand on onboard hardware and software systems. The method comprises the steps of determining a subterranean target point and a direction fixed in the payload beam, calculating the orientation that points the payload beam direction through the subterranean target point, and maintaining this payload beam orientation using an on-board attitude control system. However, these prior art systems for antenna pointing control apply to antennas having an exceedingly large number of spot beams making it impossible to optimize each spot beam separately. Some elements of prior art systems for antenna pointing control could be used to keep the spot beams provided by multiple wireless communication platforms pointed accurately relative to each other, however, antenna pointing control would be difficult, complex, and unreliable.

As can be seen, there is a need for a wireless communication system that uses multiple wireless communication platforms and therefore allows splitting of the payload. Also, there is a need for a wireless communication system, which includes multiple platforms that are interchangeable and that can be backed up by only one standby platform. Moreover, there is a need for a wireless communication system with a split payload that allows the use of larger reflectors producing smaller spot beams to provide high quality spot beam coverage for a wide geographic area.

In addition, there is a need for a closed-loop pointing control method that can be applied to wireless communication systems having multiple platforms. Also, there is a need for a closed-loop pointing control method that allows the antennas and wireless communication platforms of a wireless communication system with multiple platforms to maintain correct pointing, both relative to each other and relative to the user coverage area. Further, there is a need for a closed-loop pointing method that eliminates the need for star trackers or beacon tracking. Moreover, there is a need for a closed-loop pointing method that adds no mass to the satellite or other wireless communication platform beyond the usual antenna positioning mechanisms.

SUMMARY OF THE INVENTION

The present invention provides a wireless communication system that uses multiple wireless communication platforms and therefore allows splitting of the payload. The present invention also provides a wireless communication system that uses multiple wireless communication platforms that are interchangeable. The present invention further provides a wireless communication system suitable for, but not limited to, satellite or stratospheric Internet access systems that serve a large number of either fixed or mobile users. The present invention also provides a wireless communication system that allows the use of larger reflectors producing smaller spot beams to provide high quality spot beam coverage for a wide geographic area. The present invention still further provides a method for providing continuous coverage over a wide geographic area. Moreover, the present invention provides a closed-loop pointing control method suitable for correcting of distortion and pointing errors of wireless communication systems including multiple wireless communication platform systems.

In one aspect of the present invention, a wireless communication system comprises a first wireless communication platform and a second wireless communication platform, wherein the first wireless communication platform is interchangeable with the second wireless communication platform. The first wireless communication platform provides a first subset of cellular coverage and the second wireless communication platform provides a second subset of cellular coverage, wherein the first subset is interlaced with the second subset.

In another aspect of the present invention, a wireless communication system includes a first and a second wireless communication platform being interchangeable, a first and a second reflector both carried by the first wireless communication platform, a third and a fourth reflector both carried by the second wireless communication platform. The first reflector provides a first set of spot beams and the second reflector provides a second set of spot beams, and both reflectors receive an array of antenna feeds. The third reflector provides a third set of spot beams and the fourth reflector provides a fourth set of spot beams, and both reflectors receive an array of antenna feeds. The wireless communication system further includes a first set of stripes of cellular coverage and a second set of stripes of cellular coverage, wherein the second set of stripes is interlaced with the first set of stripes to form a geographic area receiving combined cellular coverage from the first wireless communication platform and the second wireless communication platform. The spot beams of the first set of spot beams alternate with the spot beams of the second set of spot beams within each stripe of the first set of stripes and the spot beams of the third set of spot beams alternate with the spot beams of the fourth set of spot beams within each stripe of the second set of stripes. The wireless communication system further includes a standby wireless communication platform being interchangeable with and providing back up for either one of the wireless communication platforms.

In still another aspect of the present invention, a wireless communication system comprises a first and a second wireless communication platform being interchangeable, a first and a second reflector both carried by the first wireless communication platform, a third and a fourth reflector both carried by the second wireless communication platform. The first reflector provides coverage for a first set of cells and the second reflector provides coverage for a second set of cells, and both reflectors receive an array of antenna feeds. The third reflector provides coverage for a third set of cells and the fourth reflector provides coverage for a fourth set of cells, and both reflectors receive an array of antenna feeds. The wireless communication system further includes a first set of stripes of cellular coverage and a second set of stripes of cellular coverage, wherein the second set of stripes is interlaced with the first set of stripes to form a geographic area receiving combined cellular coverage from the first wireless communication platform and the second wireless communication platform. The cells of the first set of cells alternate with the cells of the second set of cells within each stripe of the first set of stripes and the cells of the third set of cells alternate with the cells of the fourth set of cells within each stripe of the second set of stripes. The wireless communication system further includes a standby wireless communication platform being interchangeable with and providing back up for either one of the wireless communication platforms.

In yet another aspect of the present invention, a wireless communication platform comprises a first and a second reflector, wherein the first reflector provides a first set of spot beams and the second reflector provides a second set of spot beams, and both reflectors receive an array of antenna feeds. The wireless communication platform further comprises a subset of cellular coverage of a geographic area, wherein the spot beams of the first set of spot beams alternate with the spot beams of the second set of spot beams within each subset.

In a further aspect of the present invention, a method for providing continuous coverage over a wide geographic area includes the steps of: providing a wireless communication system including a first and a second wireless communication platform being interchangeable and carrying a payload that includes a first reflector, a second reflector, a third reflector, and a fourth reflector; splitting the payload between the first and the second wireless communication platform, wherein the first wireless communication platform carries the first reflector and the second reflector and the second wireless communication platform carries the third and the fourth reflector; providing an array of antenna feeds to each of the reflectors; providing a first, second, third, and fourth set of spot beams with the first, second, third, and fourth reflector; providing a first subset of cellular coverage, wherein the spot beams of the first set of spot beams alternate with the spot beams of the second set of spot beams within the first subset; providing a second subset of cellular coverage wherein the spot beams of the third set of spot beams alternate with the spot beams of the fourth set of spot beams within the second subset; interlacing the first subset with the second subset; and forming a geographic area receiving combined cellular coverage from the first wireless communication platform and the second wireless communication platform.

In a still further aspect of the present invention, a method for closed loop pointing control is disclosed, comprising the steps of: providing a wireless communication system that includes at least one wireless communication platform carrying at least one reflector and that provides cellular coverage to a geographic area; providing spot beam signals and a wide area beam signal; providing a plurality of user ground terminals, each having the capability to measure and to report signal strength data of the spot beam signal and signal strength data of the wide area beam signal; and providing a ground control station having the capability to collect the signal strength data, compute a ratio of the spot beam signal strength to the wide area beam signal strength, analyze the ratio and to send corrective commands to the reflectors as needed. The method further includes steps of: identifying and selecting a large number of sample user ground terminals evenly dispersed over the geographic area; collecting signal strength data of the spot beams and signal strength data of the wide area beam; estimating wide area coverage antenna pattern by locally averaging and geographically smoothing the collected signal strength data for the wide area beam; gathering signal strength ratio data for the ratio of each spot beam to the wide area beam; multiplying the signal strength ratio data by the smoothed wide area beam signal strength; geographically smoothing data received in the step of multiplication to receive an accurate estimate of the actual spot beam pattern; comparing the estimated spot beam pattern to ideal performance pattern; computing pointing error; generate a corrective demand to the reflector if the reflector has a pointing error with no distortion; generating progressively smaller commands for repositioning the reflector until the pointing error is eliminated; generating small corrective bus attitude commands depending on particular design of the reflector if the reflector has a pointing error with distortion; and starting a next cycle by collecting new signal strength data of the spot beams and signal strength data of the wide area beam to provide continuous pointing control.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

The present invention provides a wireless communication system that differs from prior art wireless communication systems by providing spot beams with multiple wireless communication platforms, such as satellites and multi-platform stratospheric systems. The wireless communication system is also different from prior art wireless communication systems because the use of multiple wireless communication platforms allows the splitting of the payload, such as providing two satellites each carrying two reflectors that provide cellular coverage for a certain geographic area instead of providing one prior art satellite that carries four reflectors that provides cellular coverage for the same geographic area. Therefore, the wireless communication system of the present invention would be very useful for all Internet access satellite systems. For example, a two-satellite architecture with half the payload on each satellite would provide more than double the capacity of a single-satellite solution. The wireless communication system of the present invention could further be applied to multi-platform stratospheric systems. The present invention also provides a method for providing continuous coverage over a wide geographic area by using multiple wireless communication platforms that are interchangeable. By making the multiple wireless communication platforms of the present invention interchangeable, a wider geographic area could be covered with only one standby platform needed for backup. For example, instead of using one satellite or other wireless communication platform to cover the western part of the United States and using another satellite or other wireless communication platform to cover the eastern part of the United States, each backed up by a standby platform as practiced in prior art, two interchangeable wireless communication platforms of the present invention would cover the whole geographic area of the United States by each satellite covering alternate stripes of cells. Both interchangeable wireless communication platforms together would need only one standby platform as a backup. Therefore, the wireless communication system of the present invention could be applied to satellite or stratospheric Internet access systems that serve a large number of either fixed or mobile users.

In one embodiment, the present invention provides at least two satellites or other wireless communication platforms. By using multiple platforms, the payload can be split between the wireless communication platforms. Each wireless communication platform carries a part of the payload and therefore only a certain number of reflectors providing the spot beams. Since each wireless communication platform has to carry only a part of the payload, the reflectors can be of larger size providing desirable smaller spot beams. Therefore the performance of the satellite or other wireless communication platform can be increased. For example, the capacity of a two-platform system is more than double that of a single-platform system due to the larger antennas and smaller spot beam size. Further, since each wireless communication platform carries only a part of the needed reflectors, the mass and thermal dissipation can be multiplied. To cover a large geographic area, the spot beams provided by each wireless communication platform can be interlaced with each other. By making the multiple wireless communication platforms interchangeable a larger geographic area can be covered with the need for only one backup platform. Therefore, splitting the payload is cost-effective since only one standby platform is needed as a backup. Further, the multiple platform wireless communication system of the present invention works well in conjunction with a high-power beam-hopping switch, such as U.S. patent application Ser. No. 10/172,214 submitted by Jarett, incorporated herein by reference.

The present invention further provides a closed-loop pointing control method that is different from prior art pointing control methods since it employs many already existing user ground terminals to measure and report signal strength. The closed-loop pointing control method of the present invention further differs over prior art methods by utilizing a ratio of spot beam signal strength to wide area beam signal strength to compute an actual spot beam antenna pattern. The closed-loop pointing control method could be especially valuable for use with multiple-platform wireless communication systems since it can be applied to control the correct pointing of the antennas and wireless communication platforms, both relative to each other and relative to the user coverage area. If multiple sets of spot beams provided by multiple reflectors do not maintain their relative alignment, gaps may appear in what should be overlapping coverage. The closed-loop pointing control method of the present invention solves this problem without adding hardware to the wireless communication platform. The closed-loop pointing control method of the present invention could be applied both to satellites and stratospheric platforms, which typically employ a cellular beam laydown over an area populated non-uniformly by users. The closed-loop pointing control method of the present invention could further be applied to terrestrial wireless base stations with spatial re-use.

In one embodiment, the present invention provides a closed-loop pointing control method that eliminates the typical prior art need for star trackers or beacon tracking, and adds no mass to the satellite other than the usual antenna positioning mechanisms. Instead, the closed-loop pointing control method of the present invention uses the signal strength measurement hardware that is already included in the ground terminals, gathers information in a novel way, and computes any required changes to the existing wireless communication platform pointing and antenna positioning systems. Consequently, it is possible to maintain correct pointing of the multiple wireless communication platforms, both relative to each other and relative to the user coverage area.

Figure 2:
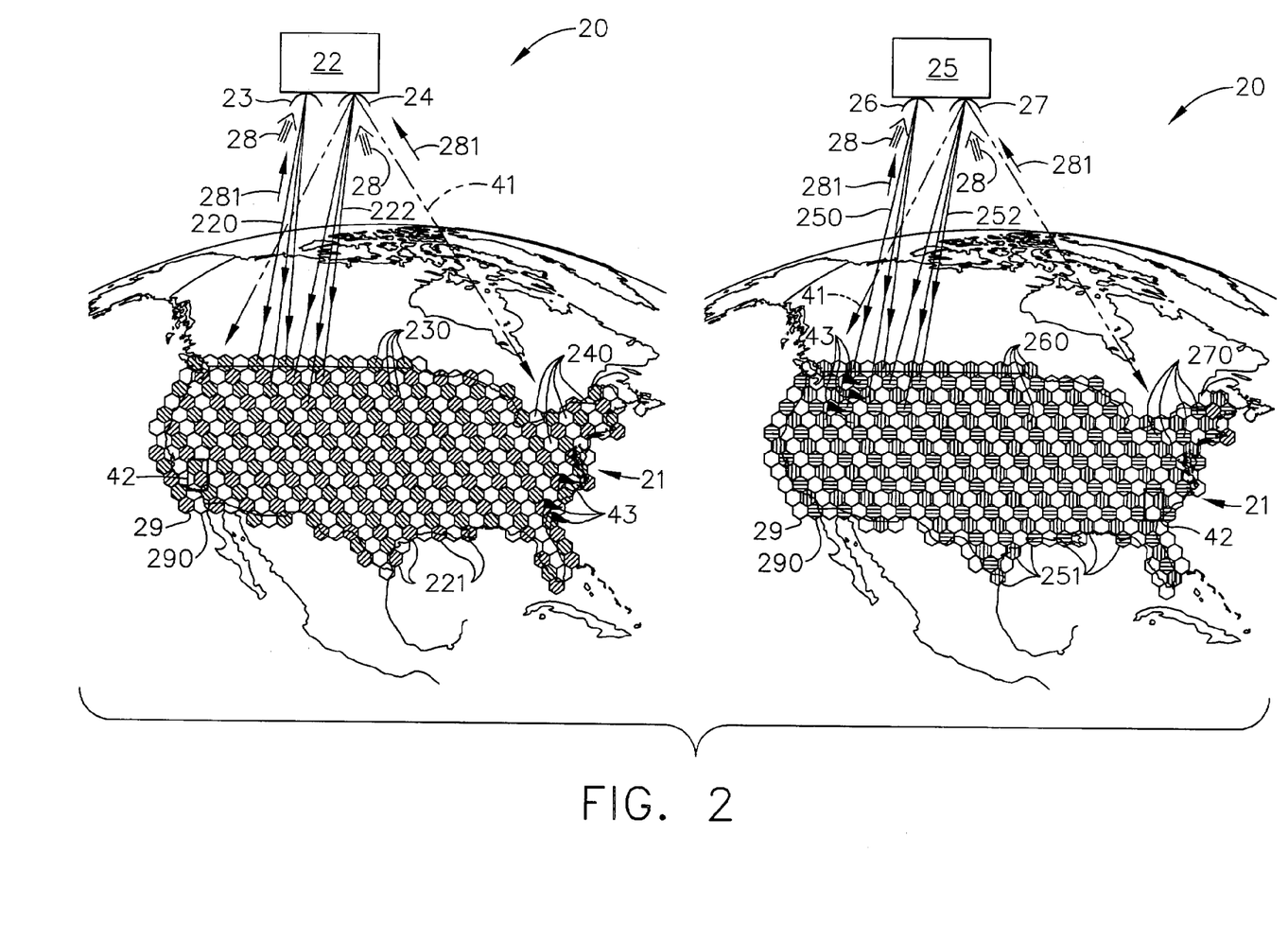
FIG. 2 is a schematic view of a wireless communication system providing a striped re-use pattern covering of the lower 48 states of the U.S.A. according to one embodiment of the present invention.

Referring now to FIG. 2, a wireless communication system 20 providing a striped, interlaced re-use pattern covering a certain geographic area 21, for example, the lower 48 states of the U.S.A., is illustrated according to one embodiment of the present invention. The wireless communication system 20 includes the stripes 221 interlaced with the stripes 251 wherein each stripe 221 comprises cells 230 alternating with cells 240 and each stripe 251 comprises cells 260 alternating with cells 270. The wireless communication system 20 further includes a first wireless communication platform 22 and a second wireless communication platform 25. Both platforms together provide cellular coverage for a certain geographic area 21. The stripes 221 and the stripes 251 comprise different subsets of cellular coverage that are interlaced. The geometric form of stripes (stripes 221 and stripes 251) for the subsets of cellular coverage is typical for the two-platform model of the wireless communication system 20, as illustrated in FIG. 2. The first wireless communication platform 22 carries reflector 23 and reflector 24. Each reflector 23 and 24 receives an array of antenna feeds 28. Reflector 23 provides spot beams 220 providing coverage for cells 230 and reflector 24 provides spot beams 222 providing coverage for cells 240, wherein spot beams 220 are alternated with spot beams 222 along the stripes 221. The second wireless communication platform 25 carries reflector 26 and reflector 27. Each reflector 26 and 27 receives an array of antenna feeds 28. Reflector 26 provides spot beams 250 providing coverage for cells 260 and reflector 27 provides spot beams 252 providing coverage for cells 270, wherein spot beams 250 are alternated with spot beams 252 along the stripes 251. One of the wireless communication platforms 22 and 25 provides also a wide area beam 41.

As shown in FIG. 2, the geographic area 21 is covered with overlapping circular cells 230, 240, 260, and 270 in a repeating re-use pattern. Each reflector serves a cell of one shade; reflector 23 serves all cells 230, reflector 24 serves all cells 240, reflector 26 serves all cells 269, and reflector 27 serves all cells 270. As can be seen in FIG. 2, the reflectors of each wireless communication platform cover the geographic area 21 in a striped, interlaced pattern. Reflector 23 covers the cells 230 alternating with the cells 240 covered by reflector 24, and both reflectors 23 and 24 of the first wireless communication platform 22 form the stripes 221. Reflector 26 covers the cells 260 alternating with the cells 270 covered by reflector 27, and both reflectors 26 and 27 of the second wireless communication platform 25 form the stripes 251. The spot beams 220 and 222 provided by the first wireless communication platform 22 form the stripes 221 which are interlaced with the stripes 251 formed by the spot beams 250 and 252 provided by the second wireless communication platform 25. Therefore, instead of providing coverage for one half of the geographic area 21 by one prior art wireless communication platform and providing coverage for the other half of the geographic area 21 by another prior art wireless communication platform, the whole geographic area 21 is covered by interlaced stripes 221 and 251, wherein reflector 23 and reflector 24 of the first wireless communication platform 22 serve the stripes 221, and wherein reflector 26 and reflector 27 of the second wireless communication platform 25 serve the stripes 251.

By adding sufficient extra feeds 281 at the edges of the geographic area 21, the first wireless communication platform 22 and the second wireless communication platform 25 can be made interchangeable. For example, stripe 29 covered by wireless communication platform 22 includes 4 cells wherein stripe 290 provided by wireless communication platform 25 includes 7 cells. To make stripes 29 and 290 interchangeable, both need to cover 7 cells. Extra feeds 281 need to be added to the first wireless communication platform 22 to provide coverage of additional 3 cells in stripe 29. Consequently, stripe 29 and stripe 290 both would then include 7 cells. Making both active platforms (the first wireless communication platform 22 and the second wireless communication platform 25) interchangeable allows a single standby platform to provide a backup for either of the active platforms.

The two-platform model as described above, can be realized by providing a wireless communication system 20 including two wireless communication platforms 22 and 25, such as satellites, each carrying two reflectors 23, 24, and 26, 27, respectively. Therefore the total wireless communication payload carried by the wireless communication system 20 can be split in half. Splitting the total wireless communication payload between the wireless communication platforms 22 and 25 allows for the reflectors 23, 24, and 26, 27, respectively, to be of larger size compared to a one-platform prior art communication system (as shown in FIG. 1), where one wireless communication platform 17 carries all four reflectors 12, 13, 14, and 15. Since the spot beam size is inversely proportional to the diameter of the antenna aperture, a larger reflector can achieve a smaller spot beam size and consequently a smaller cell size. This is desirable for a higher frequency of spatial re-use and therefore a higher quality of coverage in a certain geographic area 21. Further the capacity of the two-platform system as described is more than double that of a single-platform system due to larger reflectors and smaller spot beam size.

The two-platform system as described above does not require that the cells served by one wireless communication platform (e.g. wireless communication platform 22) need to connect directly to the cells served by the other wireless communication platform (e.g. wireless communication platform 25). The users in each cell are connected with a gateway and the gateways are interconnected by optical fiber communication links. This is an advantage over systems that require direct links from a cell served by one wireless communication platform to a cell served by another wireless communication platform that might be arranged by a short-range optical cross-link between the two wireless communication platforms requiring demodulation and remodulation of signals.

A two-platform model with each wireless communication platform carrying two reflectors as shown in FIG. 2 was chosen to illustrate the novel aspects of the wireless communication system of the present invention. The wireless communication system of the present invention is not limited to two wireless communication platforms and four reflectors. Independent from the number of wireless communication platforms and reflectors, the spot beams of each wireless communication platform always provide a subset of cellular coverage and are always interlaced with the spot beams and subsets of cellular coverage provided by the other wireless communication platforms. Further, the wireless communication platforms are designed to be interchangeable. If the total wireless communication payload is split between more than two platforms, the repeating re-use pattern for the cellular coverage of a geographic area might not be a striped, interlaced pattern, but can be any regular repeating pattern of cells.

Figure 3:
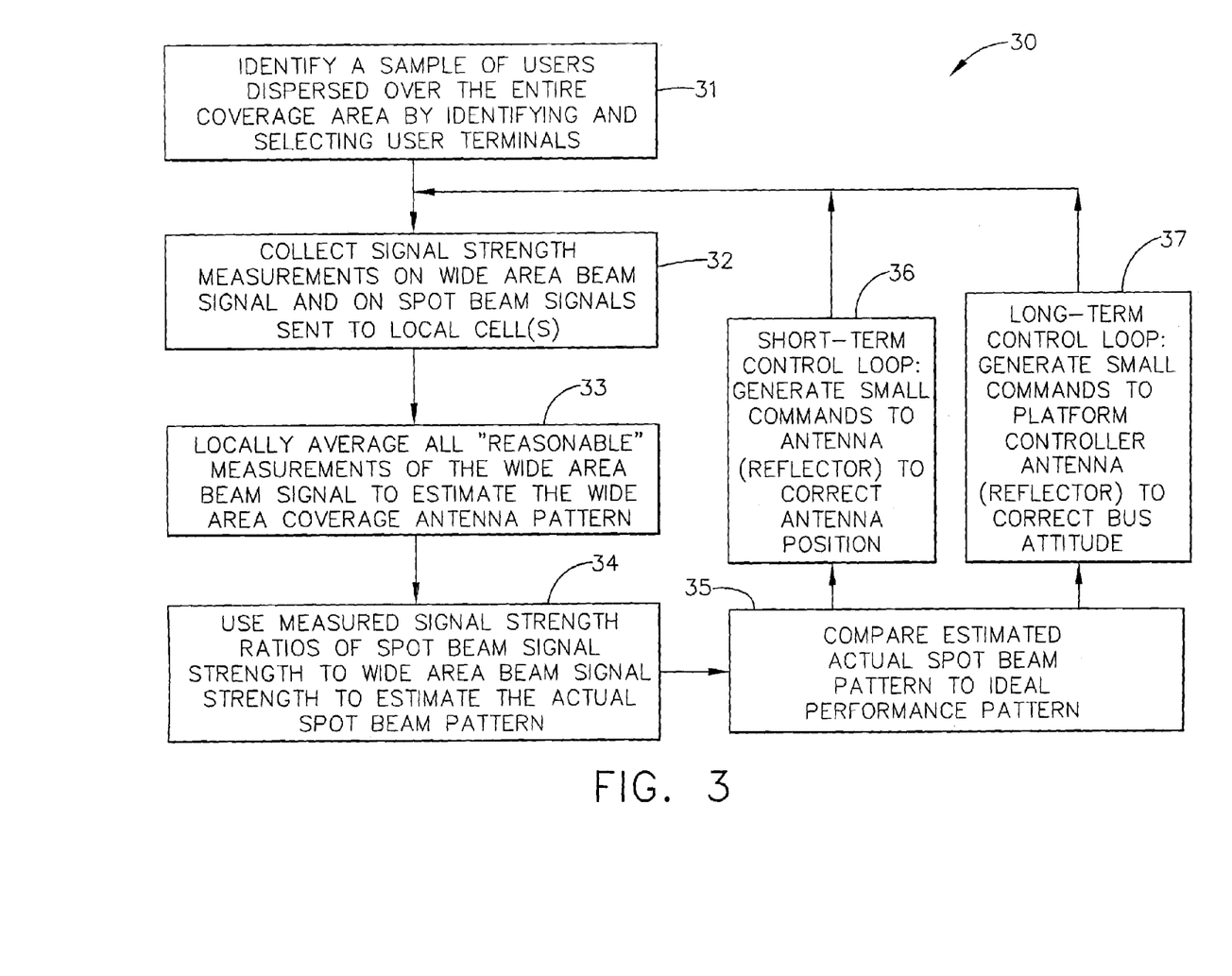
FIG. 3 is a control logic flow chart of a closed-loop pointing control method according to one embodiment of the present invention.

Referring now to FIG. 3, a closed-loop pointing control method 30 is illustrated in a simplified flow chart according to one embodiment of the present invention. The control logic flow of the closed-loop pointing control method 30 comprises steps 31, 32, 33, 34, 35, 36, and 37 as shown in FIG. 3. A ground control station 42 having the capability to collect, compute, and analyze signal strength data from spot beams ((for example, 220, 222, 250, and 252, shown in FIG. 2) and a wide area beam (for example wide area beam 41 shown in FIG. 2), and to send corrective commands to reflectors (for example, 23, 24, 26, and 27, shown in FIG. 2) as needed is provided. After the initial identification and selection of sample user ground terminals 43 in step 31, data can be collected from signal strength measurements on wide area beam (broadcast) signals and spot beam signals sent to local cells in step 32. For example, signal strength measurements can be conducted on the wide area beam 41 and on the spot beams 220, 222, 250, and 252, shown in FIG. 2. In step 33, the wide area coverage antenna pattern is estimated by locally averaging, and geographically smoothing (for example, over the geographic area 21, shown in FIG. 2) the absolute signal strength measurements for the wide area coverage beam 41. For example, signal strength data may be taken locally from the wide area beam 41 at the user ground terminals 43 distributed over the geographic area 21, as shown in FIG. 2. Since the wide area beam 41 might not have a absolutely constant signal strength over the coverage area 21, for example the signal strengths of the wide area beam 41 is often 1 dB lower at the edges of the coverage area 21, a curve fit to a smooth function with few degrees of freedom, like a parabolic, will be done. The next step 34 is to gather signal strength ratios for the ratio of each spot beam to the wide area beam. For example, signal strength ratios may be calculated for each of the spot beams 220, 222, 250, and 252 to the wide area beam 41, shown in FIG. 2. These ratios may then be multiplied by the smoothed wide area coverage signal strength data, computed in step 33. These products are smoothed geographically, for example over the geographic area 21 shown in FIG. 2, only within distances that are short relative to the expected variations in the actual spot beam signal strength. The result is, for each spot beam, for example spot beam 220, 222, 250, and 252, shown in FIG. 2, a highly accurate estimate of the actual spot beam pattern. This resulting pattern is independent of weather and other factors that equally affect the spot beam signals and the wide area beam signals, for example the signals of the spot beams 220, 222, 250, and 252 and the signal of the wide area beam 41. The estimated actual spot beam pattern can be displayed in color graphic form for the network operator as a performance-monitoring tool. Such a display of real-time spot beam pattern has not been implemented in prior art systems. In step 35, to close the tracking loops for antenna (reflector) pointing and wireless communication platform pointing, the closed-loop pointing control method 30 takes the estimated actual spot beam patterns of step 34 and compares them to ideal performance patterns. If the antenna has pure pointing characteristics and a pointing error with no distortion, it is a simple matter to compute the pointing error and generate a corrective command to the antenna (reflector) for a small move in the right direction, as in step 36. For example, the closed-loop pointing control method 30 will generate progressively smaller commands and will send these commands to the reflector 23 and the reflector 24 of the first platform 22 as well as to the reflector 26 and the reflector 27 of the second platform 25 for repositioning each of the reflectors 23, 24, 26, and 27 until the pointing error is essentially eliminated. Typically, the antenna will have distortion as well as pointing error. In this case, the spot beams (for example, 220, 222, 250, and 252, shown in FIG. 2) change shape and size, not just the pointing direction. The types of corrective commands that are available to correct such problem and the results that are provided by these commands depend on the particular design of antenna (for example, 220, 222, 250, and 252, shown in FIG. 2) and are usually corrective bus attitude and/or reflector positioning commands. The particular algorithm selected in step 37 to compute the corrective commands generated by the closed-loop pointing control method 30 depends therefore on the particular design of antenna. Also, the system operator should select a particular algorithm such that optimum performance is reached in all geographic coverage areas. Finally, the loop is closed by proceeding from step 36 or step 37 to step 32 to start the next cycle of the closed-loop pointing control method 30 to provide continuous pointing control.

The closed-loop pointing control method 30 may employ many user ground terminals 43, each of which has the capability to measure and report signal strength for any requested signal. One requirement for the closed-loop pointing control method 30 of the present invention is that the wireless communication system has both a wide area coverage beam and spot beams (for example, spot beams 220, 222, 250, and 252, and a wide area beam 41, shown in FIG. 2). Although the spot beam signal strength at a user ground terminal 43 can vary greatly due to the user's terminal performance, local obstructions, and for any number of other causes, the ratio of the spot beam signal strength to the wide area beam signal strength depends only on the relative strength of downlink signals. The closed-loop pointing control method 30 relies primarily on these ratios, collected from a large number of user ground terminals 43 in different locations, to compute the actual spot beam antenna pattern. The user ground terminal population should be sufficient in number and well distributed, so that measurements can be collected from all portions of all spot beams (for example, 220, 222, 250, and 252, shown in FIG. 2). Access systems, such as satellites that provide Internet access, would typically satisfy this requirement. If the number of users in a given geographic area is large enough, only a subset of the existing terminals 43 needs to be used for these measurements. The measurements can be pre-scheduled to minimize the load imposed on the communication links. The closed-loop pointing control method 30 requires approximate knowledge of the location of each user terminal 43. For many systems using fixed terminals, the zip code would suffice. For mobile terminals, GPS (global positioning system) data is preferred. It is an advantage of the closed-loop pointing control method 30 that it utilizes already existing user ground terminals 43 with signal strength reporting capability. Even if the terminals 43 cannot simultaneously receive two signals (one from a spot beam (for example, 220, 222, 250, and 252, shown in FIG. 2) and one from the wide area beam (for example 41 in FIG. 2)), they can be commanded to tune to the different channels and make the required measurements in rapid succession.

By providing a wireless communication system that uses multiple wireless communication platforms the splitting of the payload is possible. Still, mounting the reflectors on different wireless communication platforms has the disadvantage that the potential pointing error increases with the number of wireless communication platforms. If spot beams are provided by multiple wireless communication platforms for covering one geographic area, it is necessary that the spot beams are pointed accurately relative to each other and relative to the user coverage area. Spot beam antenna patterns are nominally fixed, but they do change as the wireless communication platform (e.g., satellite or stratospheric platform) is disturbed, and as the antenna's characteristics change, for example due to sun-induced warping. Therefore, the reflectors will develop over time distortion and pointing errors. By applying the closed-loop pointing control method 30, it is possible to keep multiple wireless communication platforms pointed accurately relative to each other and relative to the user coverage area without adding mass to the wireless communication platform and by using the signal strength measurement hardware that is already included in the ground terminals.

It should be understood, of course, that the foregoing relates to preferred embodiments of the invention and that modifications may be made without departing from the spirit and scope of the invention as set forth in the following claims.

I claim:

1. A wireless communication system for a cellular coverage area having a re-use pattern of cells represented by a plurality of different cell shades, the system comprising a first wireless communication platform and a second wireless communication platform, wherein said first wireless communication platform is interchangeable with said second wireless communication platform and wherein said first wireless communication platform provides a first subset of cellular coverage for the cellular coverage area using a first cell shade alternating with a second cell shade and said second wireless communication platform provides a second subset of cellular coverage for the cellular coverage area using a third cell shade alternating with a fourth cell shade, wherein said first subset of cellular coverage is interlaced with said second subset of cellular coverage.

2. The wireless communication system of claim 1, further comprising at least one additional wireless communication platform, wherein each of said additional wireless communication platforms is interchangeable with said first wireless communication platform and with said second wireless communication platform, and wherein each of said additional wireless communication platforms provides an additional subset of cellular coverage for the cellular coverage area, wherein said additional subset of cellular coverage is interlaced with said first subset of cellular coverage and said second subset of cellular coverage.

3. The wireless communication system of claim 1, further comprising a standby wireless communication platform being interchangeable with said first wireless communication platform and with said second wireless communication platform, and wherein said standby wireless communication platform provides back up for said first wireless communication platform and for said second wireless communication platform.

4. The wireless communication system of claim 1, wherein said first wireless communication platform carries at least two reflectors and each of said reflectors receives an array of antenna feeds and provides a set of spot beams.

5. The wireless communication system of claim 4, wherein each of said reflectors of said first wireless communication platform receives at least one additional antenna feed at the edge of a geographic area that receives cellular coverage from said first wireless communication platform.

6. A wireless communication system comprising a first wireless communication platform and a second wireless communication platform, wherein said first wireless communication platform is interchangeable with said second wireless communication platform and wherein said first wireless communication platform provides a first subset of cellular coverage and said second wireless communication platform provides a second subset of cellular coverage, wherein said first subset of cellular coverage is interlaced with said second subset of cellular coverage; wherein
said first wireless communication platform carries at least two reflectors and each of said reflectors receives an array of antenna feeds and provides a set of spot beams; and
each of said reflectors of said first wireless communication platform has a larger size than a reflector used in one-platform wireless communication systems.

7. The wireless communication system of claim 1, wherein said second wireless communication platform carries at least two reflectors and each of said reflectors receives an array of antenna feeds and provides a set of spot beams.

8. The wireless communication system of claim 7, wherein each of said reflectors of said second wireless communication platform receives at least one additional antenna feed at the edge of a geographic area that receives cellular coverage from said second wireless communication platform.

9. A wireless communication system comprising a first wireless communication platform and a second wireless communication platform, wherein said first wireless communication platform is interchangeable with said second wireless communication platform and wherein said first wireless communication platform provides a first subset of cellular coverage and said second wireless communication platform provides a second subset of cellular coverage, wherein said first subset of cellular coverage is interlaced with said second subset of cellular coverage; wherein
said second wireless communication platform carries at least two reflectors and each of said reflectors receives an array of antenna feeds and provides a set of spot beams; and
each of said reflectors of said second wireless communication platform has a larger size than a reflector used in one-platform wireless communication systems.

10. The wireless communication system of claim 1, further comprising a payload split between said first wireless communication platform and said second wireless communication platform.

11. The wireless communication system of claim 1, wherein said first wireless communication platform further provides a wide area beam.

12. The wireless communication system of claim 1, wherein said second wireless communication platform further provides a wide area beam.

13. A wireless communication system for a cellular coverage area having a re-use pattern of cells represented by a plurality of different cell shades, comprising:
a first wireless communication platform;
a second wireless communication platform being interchangeable with said first wireless communication platform;
a first reflector and a second reflector both said first reflector and said second reflector being carried by said first wireless communication platform, wherein said first reflector provides a first set of spot beams corresponding to a first cell shade and said second reflector provides a second set of spot beams corresponding to a second cell shade, and both said first reflector and said second reflector receive an array of antenna feeds;
a third reflector and a fourth reflector both said third reflector and said fourth reflector being carried by said second wireless communication platform, wherein said third reflector provides a third set of spot beams corresponding to a third cell shade and said fourth reflector provides a fourth set of spot beams corresponding to a fourth cell shade, and both said third reflector and said fourth reflector receive said array of antenna feeds;
a first set of stripes of cellular coverage, wherein said spot beams of said first set of spot beams alternate with said spot beams of said second set of spot beams within each stripe of said first set of stripes;
a second set of stripes of cellular coverage, wherein said spot beams of said third set of spot beams alternate with said spot beams of said fourth set of spot beams within each stripe of said second set of stripes, and said second set of stripes is interlaced with said first set of stripes to form a geographic area receiving combined cellular coverage from said first wireless communication platform and said second wireless communication platform; and
a standby wireless communication platform being interchangeable with said first wireless communication platform and with said second wireless communication platform, and wherein said standby wireless communication platform provides back up for said first wireless communication platform and for said second wireless communication platform.

14. The wireless communication system of claim 13, wherein said first wireless communication platform comprises at least one additional reflector with each said additional reflector providing one additional set of spot beams and said spot beams of said additional set of spot beams alternate with said spot beams of said first set of spot beams and with said spot beams of said second set of spot beams.

15. The wireless communication system of claim 13, wherein said second wireless communication platform comprises at least one additional reflector with each said additional reflector providing one additional set of spot beams and said spot beams of said additional set of spot beams alternate with said spot beams of said third set of spot beams and with said spot beams of said fourth set of spot beams.

16. The wireless communication system of claim 13, further comprising a payload including said first reflector, said second reflector, said third reflector, and said fourth reflector, and wherein said payload is split between said first wireless communication platform and said second wireless communication platform, and wherein said first reflector, said second reflector, said third reflector, and said fourth reflector have a larger size than a reflector in a one-platform wireless communication system.

17. A wireless communication system for a cellular coverage area having a re-use pattern of cells represented by a plurality of different cell shades, comprising:
a first wireless communication platform;
a second wireless communication platform being interchangeable with said first wireless communication platform;
a first reflector and a second reflector both said first reflector and said second reflector being carried by said first wireless communication platform, wherein said first reflector provides coverage for a first set of cells corresponding to a first cell shade and said second reflector provides coverage for a second set of cells corresponding to a second cell shade, and both said first reflector and said second reflector receive an array of antenna feeds;
a third reflector and a fourth reflector both said third reflector and said fourth reflector being carried by said second wireless communication platform, wherein said third reflector provides coverage for a third set of cells corresponding to a third cell shade and said fourth reflector provides coverage for a fourth set of cells corresponding to a fourth cell shade, and both said third reflector and said fourth reflector receive said array of antenna feeds;
a first set of stripes of cellular coverage, wherein said cells of said first set of cells alternate with said cells of said second set of cells within each stripe of said first set of stripes;
a second set of stripes of cellular coverage, wherein said cells of said third set of cells alternate with said cells of said fourth set of cells within each stripe of said second set of stripes, and said second set of stripes is interlaced with said first set of stripes to form a geographic area receiving combined cellular coverage from said first wireless communication platform and said second wireless communication platform; and
a standby wireless communication platform being interchangeable with said first wireless communication platform and with said second wireless communication platform, and wherein said standby wireless communication platform provides back up for said first wireless communication platform and for said second wireless communication platform.

18. The wireless communication system of claim 17, wherein said first reflector, said second reflector, said third reflector and said fourth reflector receive at least one additional antenna feed at the edge of said geographic area, and wherein said first reflector and said second reflector provide coverage for a number of cells within each stripe of said first set of stripes, and wherein said third reflector and said fourth reflector provide coverage for said number of cells within each stripe of said second set of stripes.

19. The wireless communication system of claim 17, wherein said first wireless communication platform comprises at least one additional reflector with each said additional reflector providing coverage for one additional set of cells and said cells of said additional set of cells alternate with said cells of said first set of cells and with said cells of said second set of cells.

20. The wireless communication system of claim 17, wherein said second wireless communication platform comprises at least one additional reflector with each said additional reflector providing coverage for one additional set of cells and said cells of said additional set of cells alternate with said cells of said third set of cells and with said cells of said fourth set of cells.

21. A wireless communication platform for a cellular coverage area having a re-use pattern of cells, the re-use pattern of cells being represented by a plurality of different cell shades, comprising:
   a first reflector and a second reflector carried by the wireless communication platform, wherein said first reflector provides a first set of spot beams for the cellular coverage area using a first cell shade and said second reflector provides a second set of spot beams for the cellular coverage area using a second cell shade, and both said first reflector and said second reflector receive an array of antenna feeds; and
   a subset of cellular coverage of a geographic area, wherein said spot beams of said first set of spot beams alternate with said spot beams of said second set of spot beams within said subset.

22. The wireless communication platform of claim 21, wherein one of said reflectors further provides a wide area beam.

23. The wireless communication platform of claim 21, wherein each of said reflectors receives at least one additional antenna feed at the edge of said geographic area.

24. A method for providing continuous cellular coverage with a re-use pattern of cells represented by a plurality of different cell shades over a wide geographic area, including the steps of:
   providing a wireless communication system including a first wireless communication platform and a second wireless communication platform, wherein said platforms are interchangeable and wherein said platforms carry a payload that includes a first reflector, a second reflector, a third reflector, and a fourth reflector;
   splitting said payload between said first wireless communication platform and said second wireless communication platform, wherein said first wireless communication platform carries said first reflector and said second reflector and said second wireless communication platform carries said third and said fourth reflector;
   providing an array of antenna feeds to each of said reflectors;
   providing a first set of spot beams with said first reflector, the first set of spot beams corresponding to a first cell shade;
   providing a second set of spot beams with said second reflector, the second set of spot beams corresponding to a second cell shade;
   providing a third set of spot beams with said third reflector, the third set of spot beams corresponding to a third cell shade;
   providing a fourth set of spot beams with said fourth reflector, the fourth set of spot beams corresponding to a fourth cell shade;
   providing a first subset of cellular coverage, wherein said spot beams of said first set of spot beams alternate with said spot beams of said second set of spot beams within said first subset;
   providing a second subset of cellular coverage wherein said spot beams of said third set of spot beams alternate with said spot beams of said fourth set of spot beams within said second subset;
   interlacing said first subset with said second subset; and
   forming a geographic area receiving combined cellular coverage from said first wireless communication platform and said second wireless communication platform.

25. The method of claim 24, further including a step of providing at least one additional antenna feed to each of said reflectors at the edge of said geographic area.

26. The method of claim 24, further including the steps of:
   providing a standby wireless communication platform; and
   providing back up for said first wireless communication platform and said second wireless communication platform with said standby wireless communication platform.

27. The method of claim 24, wherein closed-loop pointing control is provided to keep said first wireless communication platform and said second wireless communication platform pointed accurately relative to each other and relative to said geographic area receiving combined cellular coverage.

28. A method for closed loop pointing control, comprising the steps of:
   providing a wireless communication system that includes at least one wireless communication platform carrying at least one reflector and that provides cellular coverage to a geographic area;
   providing spot beam signals having a certain strength with said wireless communication platform;
   providing a wide area beam signal having a certain strength with said wireless communication platform;
   providing a plurality of user ground terminals, each having the capability to measure and to report signal strength data of said spot beam signal and signal strength data of said wide area beam signal;
   providing a ground control station having the capability to collect said signal strength data, compute a ratio of said spot beam signal strength to said wide area beam signal strength, analyze said ratio and to send corrective commands to said reflectors as needed;
   identifying and selecting sample user ground terminals evenly dispersed over said geographic area;
   collecting signal strength data of said spot beams and collecting signal strength data of said wide area beam;
   estimating a wide area coverage antenna pattern by locally averaging and geographically smoothing said collected signal strength data for said wide area beam;
   gathering signal strength ratio data for the ratio of each spot beam to said wide area beam;
   multiplying said signal strength ratio data by said smoothed wide area beam signal strength;
   geographically smoothing data received in said step of multiplying to receive an accurate estimate of the actual spot beam pattern;
   comparing said estimated spot beam pattern to an ideal performance pattern;
   computing a pointing error;

generating a corrective demand to said reflector if said reflector has a pointing error with no distortion;

generating progressively smaller commands for repositioning said reflector until said pointing error is eliminated;

generating small corrective bus attitude commands depending on particular design of said reflector if said reflector has a pointing error with distortion; and starting a next cycle by collecting new signal strength data of said spot beams and signal strength data of said wide area beam to provide continuous pointing control.

29. The method of claim 28, further comprising a step of providing user ground terminals that are sufficient in number and well distributed over said geographic area and wherein the approximate location of said user ground terminals is known.

30. The method of claim 28, further providing a step of measuring said strength of said spot beam signals and said strength of said wide area beam signal in rapid succession at each of said user ground terminals.

31. The method of claim 28, further comprising a step of providing a wireless communication system that includes a first wireless communication platform and a second wireless communication platform, wherein said first wireless communication platform is interchangeable with said second wireless communication platform and wherein said first wireless communication platform provides a first subset of cellular coverage and said second wireless communication platform provides a second subset of cellular coverage, wherein said first subset is interlaced with said second subset.

* * * * *